US011350160B1

(12) United States Patent
Burnley et al.

(10) Patent No.: US 11,350,160 B1
(45) Date of Patent: May 31, 2022

(54) MANAGEMENT OF A CLIENT DEVICE BUFFER

(71) Applicant: Synamedia Limited, Staines Upon Thames (GB)

(72) Inventors: Thomas Paul Burnley, Hampshire (GB); Einav Rivni, Beit-Shemesh (IL); Uziel Joseph Harband, Jerusalem (IL)

(73) Assignee: Synamedia Limited, Staines Upon (GB)

( * ) Notice: Subject to any disclaimer, the term of this patent is extended or adjusted under 35 U.S.C. 154(b) by 0 days.

(21) Appl. No.: 17/230,520

(22) Filed: Apr. 14, 2021

(51) Int. Cl.
| *H04N 7/173* | (2011.01) |
| *H04N 21/44* | (2011.01) |
| *H04N 21/2662* | (2011.01) |
| *H04N 21/442* | (2011.01) |
| *H04N 21/462* | (2011.01) |

(52) U.S. Cl.
CPC ... *H04N 21/44004* (2013.01); *H04N 21/2662* (2013.01); *H04N 21/44209* (2013.01); *H04N 21/4621* (2013.01)

(58) Field of Classification Search
CPC ......... H04N 21/44004; H04N 21/2662; H04N 21/44209; H04N 21/4621
See application file for complete search history.

(56) References Cited

U.S. PATENT DOCUMENTS

| 9,413,806 | B2 * | 8/2016 | Li | H04N 21/2225 |
| 2012/0297081 | A1 * | 11/2012 | Karlsson | H04L 65/60 709/231 |
| 2016/0373821 | A1 * | 12/2016 | Nair | H04L 65/601 |
| 2017/0064342 | A1 * | 3/2017 | Botsford | H04N 21/8547 |

* cited by examiner

*Primary Examiner* — Mulugeta Mengesha
(74) *Attorney, Agent, or Firm* — Fernando & Partners, LLP

(57) ABSTRACT

A method includes transmitting, to a client device, a portion of a first ABR segment, characterized by a first representation, according to a first predefined protocol, and transmitting a first buffer management instruction that is associated with the portion of the first ABR segment. The method includes obtaining a performance status characteristic from the client device. The performance status characteristic characterizes the client device receiving the portion of the first ABR segment. The method includes, in response to determining that the performance status characteristic satisfies a representation change condition, transmitting, to the client device, a portion of a second ABR segment, characterized by a second representation, according to a second predefined protocol that is different from the first predefined protocol, and transmitting a second buffer management instruction that is associated with the portion of the second ABR segment.

20 Claims, 5 Drawing Sheets

MANAGEMENT OF A CLIENT DEVICE BUFFER

TECHNICAL FIELD

The present disclosure relates to buffer management, and in particular, a network device managing storage of video frames in a buffer of a client device.

BACKGROUND

Network deployments that facilitate delivery of video frames to a client device have various shortcomings. For example, in a video streaming deployment, a client device receives video frames from a source device, and displays the video frames for a user of the client device. However, in some video streaming deployments, a relatively large amount of latency exists because of correspondingly high buffering demands at the client device. As another example, a video conferencing deployment foregoes buffering at the client device, leading to a relatively high level of video frame loss and thus a degraded user experience.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
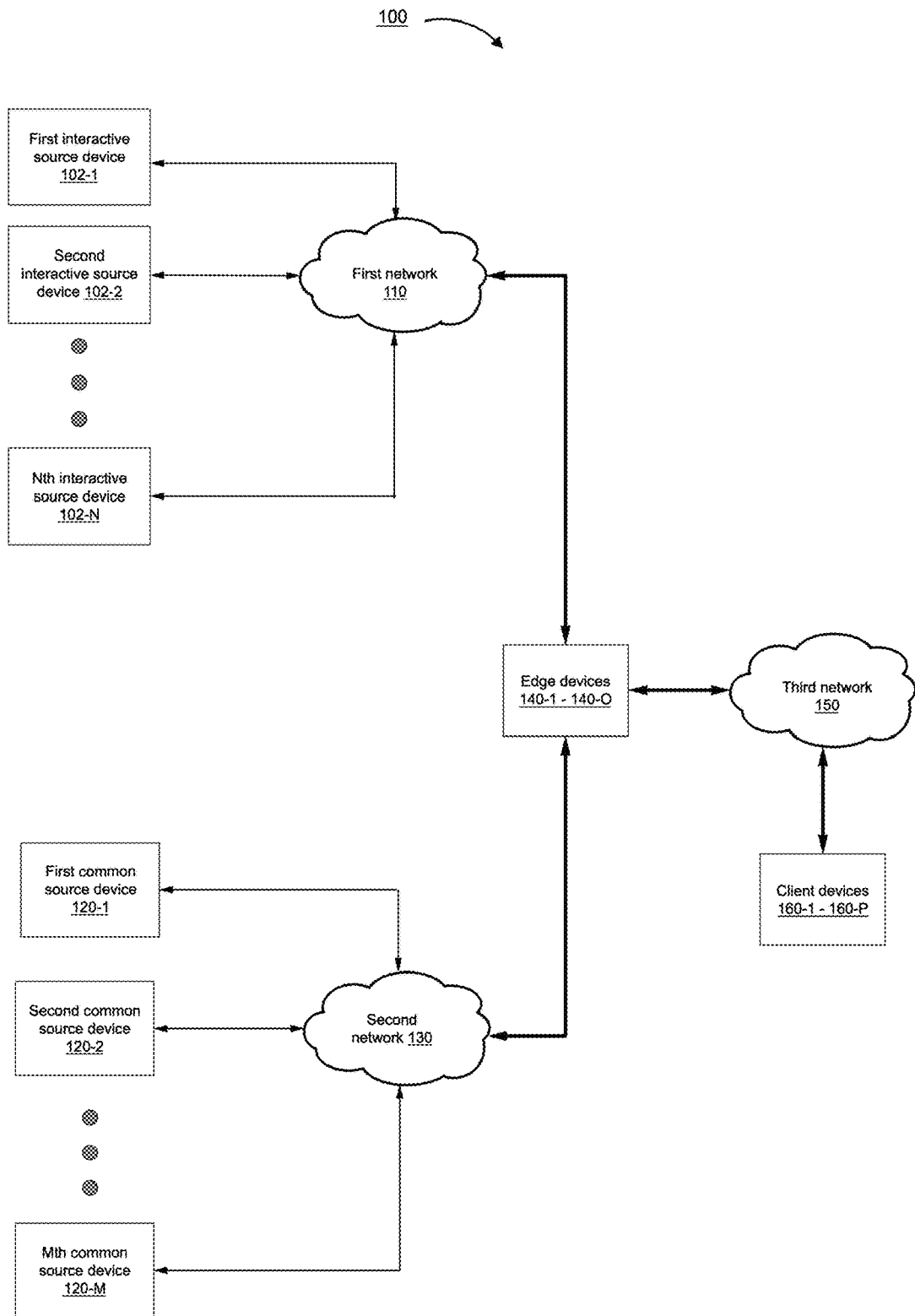
FIG. 1 is a block diagram of an example of a content delivery environment in accordance with some embodiments.

In accordance with common practice, various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Techniques for efficient transmission, to a client device, ABR segments and corresponding buffer management instructions for storing the ABR segments in a client device buffer are disclosed herein. In some embodiments, the buffer of the client device is smaller than in other video streaming deployments. For example, other video streaming deployments include a relatively large client device buffer in order to prevent interruption during video playback. To that end, in some embodiments, a network device obtains, from the client device, a performance status characteristic that characterizes the client device receiving a particular ABR segment or portion thereof. For example, the performance status characteristic indicates bandwidth currently available to the client device, fullness of the buffer of the client device, etc. The network device may be an edge device in or near a cloud, which includes content delivery servers. Based on the performance status characteristic, the network device selects a suitable representation (e.g., suitable encoding bitrate) of video content requested by the client device, and delivers the selected representation to the client device. For example, the network device determines, based on the performance status characteristic, that the client device is experiencing a temporary loss of bandwidth. Accordingly, the network device delivers lower resolution video frames to the client device. Additionally, the network device transmits corresponding management instructions in order to instruct the client device to buffer the selected representation in an efficient way, given the relatively small size of the buffer of the client device. Continuing with the previous example, the corresponding management instructions instruct the client device to overwrite the stored video segments of the higher resolution with the selected, lower resolution video frames.

In accordance with some embodiments, a method is performed at a network device including a plurality of network interfaces. The method includes, transmitting, to a client device, a portion of a first adaptive bitrate (ABR) segment and a first buffer management instruction that is associated with the portion of the first ABR segment. Transmitting the portion of the first ABR segment is according to a first predefined protocol. The first ABR segment is characterized by a first representation of a particular media object. The method includes obtaining a performance status characteristic from the client device. The performance status characteristic characterizes the client device receiving the portion of the first ABR segment. The method includes, in response to determining that the performance status characteristic satisfies a representation change condition, transmitting, to the client device, a portion of a second ABR segment and a second buffer management instruction that is associated with the portion of the second ABR segment. Transmitting the second ABR segment is according to a second predefined protocol that is different from the first predefined protocol. The second ABR segment is characterized by a second representation of the particular media object that is different from the first representation.

In accordance with some embodiments, a network device includes one or more processors, a non-transitory memory, and a plurality of network interfaces. The one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a network device, cause the network device to perform or cause performance of the operations of any of the methods described herein. In accordance with some embodiments, a network device includes means for performing or causing performance of the operations of any of the methods described herein. In accordance with some embodiments, an information processing apparatus, for use in a network device, includes means for performing or causing performance of the operations of any of the methods described herein.

In certain video streaming deployments (e.g., video on demand (VOD), over the top (OTT), etc.), a client device includes a relatively large buffer in order to prevent interruption of video streaming at the client device. In particular, the client device fills the buffer above a threshold before playing (e.g., displaying) the video frames to the user. Accordingly, these video streaming deployments are associated with relatively high latency, as the video frames are not played until the buffer of the client device is sufficiently filled. For example, there is a large time delay between when a user requests playback of an unbuffered program (e.g., requesting to start a movie from the home screen or scrubbing ahead in a currently playing movie) and when playback of the program begins. On the other hand, video conferencing deployments provide unbuffered video communications between peer devices, providing lower latency face-to-face interactions between respective users of the peer devices. However, the absence of buffering in video conferencing deployments results in frequent video loss. Accordingly, each type of video delivery deployment has shortcomings.

By contrast, various embodiments described below provide more efficient transmission of ABR video segments and corresponding buffer management instructions to a client device.

Example Embodiments

FIG. 1 is a block diagram of an example of a content delivery environment 100 in accordance with some embodiments. Briefly, the first content delivery environment 100 includes one or more edge devices 140-1-140-0 that deliver various source ABR assets from a plurality of common source devices to one or more client devices 160-1-160-P via a third network 150. To that end, each of the edge device(s) 140-1-140-0 includes a plurality of network interfaces that enable communication with a plurality of common source devices and communication with one or more client devices. The plurality of network interfaces may be associated with personal area networks (PANs), wired local area networks (LANs), wireless local area networks (WLANs), wireless wide area networks (WWANs), and so forth. The plurality of network interfaces can utilize acoustic, radio frequency, optical, or other signals to exchange data between the plurality of common source devices and the client device(s) 160-1-160-P. The plurality of common source devices incudes one or more interactive source devices 102-1-102-N and one or more common source devices 120-1-120-M. The interactive source device(s) 102-1-102-N provide respective content to the edge device(s) 140-1-140-0 via a first network 110, and the common source device(s) 120-1-120-M provide respective source assets to the edge device(s) 140-1-140-0 via a second network 130.

A particular interactive source device provides, to an edge device, customizable content, such as a user interface (UI) element (e.g., poster or a banner). The edge device ultimately delivers the UI element to a client device that requested the UI element. For example, based on receiving a keypress input from a client device requesting a home screen (e.g., a series of thumbnails that provide previews of different movie/TV titles), an edge device relays the request to an interactive source device.

A particular common source device may provide, to an edge device, one or more source adaptive bitrate (ABR) assets. The source ABR asset(s) can include any multimedia data, such as video data, audio data, etc. In some embodiments, the common source device(s) 120-1-120-M collectively correspond to a network of distributed content delivery systems, such as a content delivery network (CDN).

Each of the first network 110, the second network 130, and the third network 150 may correspond to one of a variety of different types of networks. For example, one of the networks may correspond to one of a Wi-Fi network, a Wi-Fi Direct network, BLUETOOTH, a radio network, a cellular network (e.g., third generation, fourth generation (e.g., LTE), and/or fifth generation (5G)), a satellite network, a cable network, a landline-based network, the Internet, intranets, a telephone network, a television network, data networks, or other communication mediums connecting multiple computing devices to one another, as non-limiting examples.

The edge device(s) 140-1-140-0 collectively deliver various content types from the plurality of common source devices to the one or more client devices 160-1-160-P. In some embodiments, there is a one-to-one relationship between the edge device(s) 140-1-140-0 and the client device(s) 160-1-160-P. For example, a first edge device delivers content to a first client device, a second edge device delivers content to a second client device, etc. In some embodiments, a particular edge device delivers content to a plurality of client devices, such as when the plurality of client devices share common characteristics (e.g., similar geography, similar viewing patterns, etc.). Examples of the client device(s) 160-1-160-P includes user equipment (UE) directly usable by an end user, such as a laptop, smartphone, tablet, etc.

Figure 2:
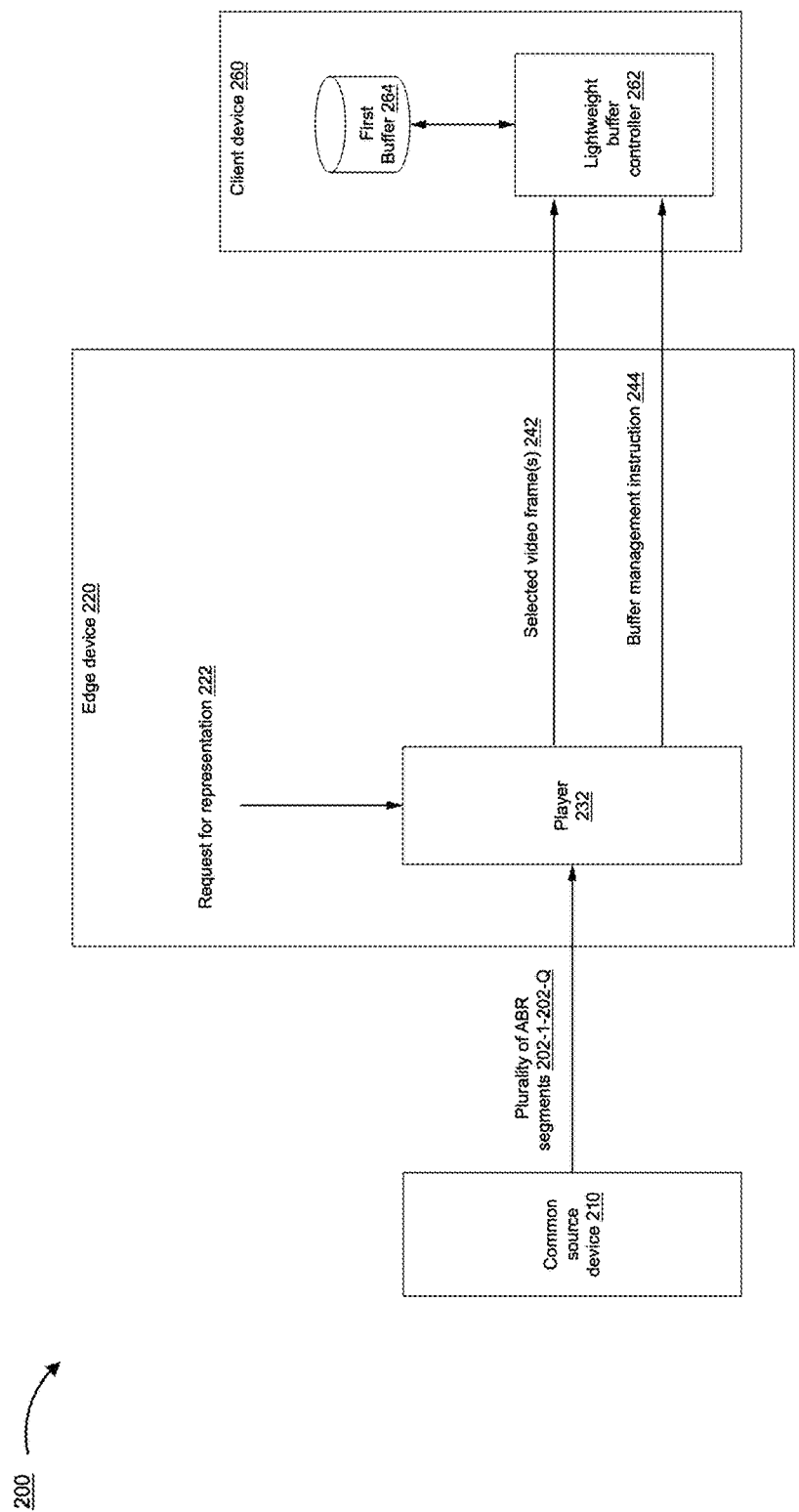
FIG. 2 is a block diagram of an example of a first environment for delivering video frames to a client device and correspondingly managing a buffer of the client device in accordance with some embodiments.

FIG. 2 is a block diagram of an example of a first environment 200 for delivering video frames to a client device and correspondingly managing a buffer of the client device in accordance with some embodiments. The first environment 200 includes a common source device 210, an edge device 220, and a client device 260.

At a given time, the common source device 210 provides a plurality of ABR segments 202-1-202-Q to a player 232 of the edge device 220. Each of the plurality of ABR segments 202-1-202-Q is characterized by a different representation/encoding rate. For example, a first ABR segment 202-1 corresponds to 4K video resolution, a second ABR segment 202-2 corresponds to 1080p video resolution, etc. As one example, the plurality of ABR segments 202-1-202-Q is associated with a particular media object (e.g., a particular movie or television show), based on what is currently playing or requested to be played by the client device 260. In some embodiments, the common source device 210 corresponds to a content delivery server within a content delivery network (CDN).

The player 232 selects a particular one of the plurality of ABR segments 202-1-202-Q based on a request for representation 222. The selected ABR segment is suitable for transmission to and subsequent playback at the client device 260. For example, the request for representation 222 is based on a performance status characteristic from the client device

260, as will be described with reference to FIG. 3. Accordingly, the transmits one or more selected video frames 242 to the client device 260. For example, based on the request for representation 222 indicating a request for 4K video, the player 232 selects a first ABR segment 202-1 that is characterized by a 4K video resolution. Continuing with this example, the player 232 transmits, to the client device 260, a portion of the first ABR segment 202-1 as the selected video frame(s) 242. The portion of the first ABR segment 202-1 may correspond to a subset of the video frames of the first ABR segment 202-1. In other words, the portion of the first ABR segment may be smaller than the entirety of the first ABR segment 202-1.

Moreover, the player 232 transmits, to the client device 260, a buffer management instruction 244 that is associated with the selected video frame(s) 242. In particular, the buffer management instruction 244 instructs a lightweight buffer controller 262, of the client device 260, to store the selected video frame(s) 242 in a first buffer 264 of the client device 260. In some embodiments, the first buffer 264 is relatively small (e.g., shallow), as compared with other client device buffers. Moreover, in contrast to other video streaming environments in which a client device selects a suitable ABR segment, the player 232 of the edge device 220 selects the suitable video frames 242. Having the edge device 220 select the suitable video frames 242 enables the client device 260 to forego selecting video frames. Accordingly, the lightweight buffer controller 262 performs less complex buffer operations than other client device buffer controllers.

Figure 3:
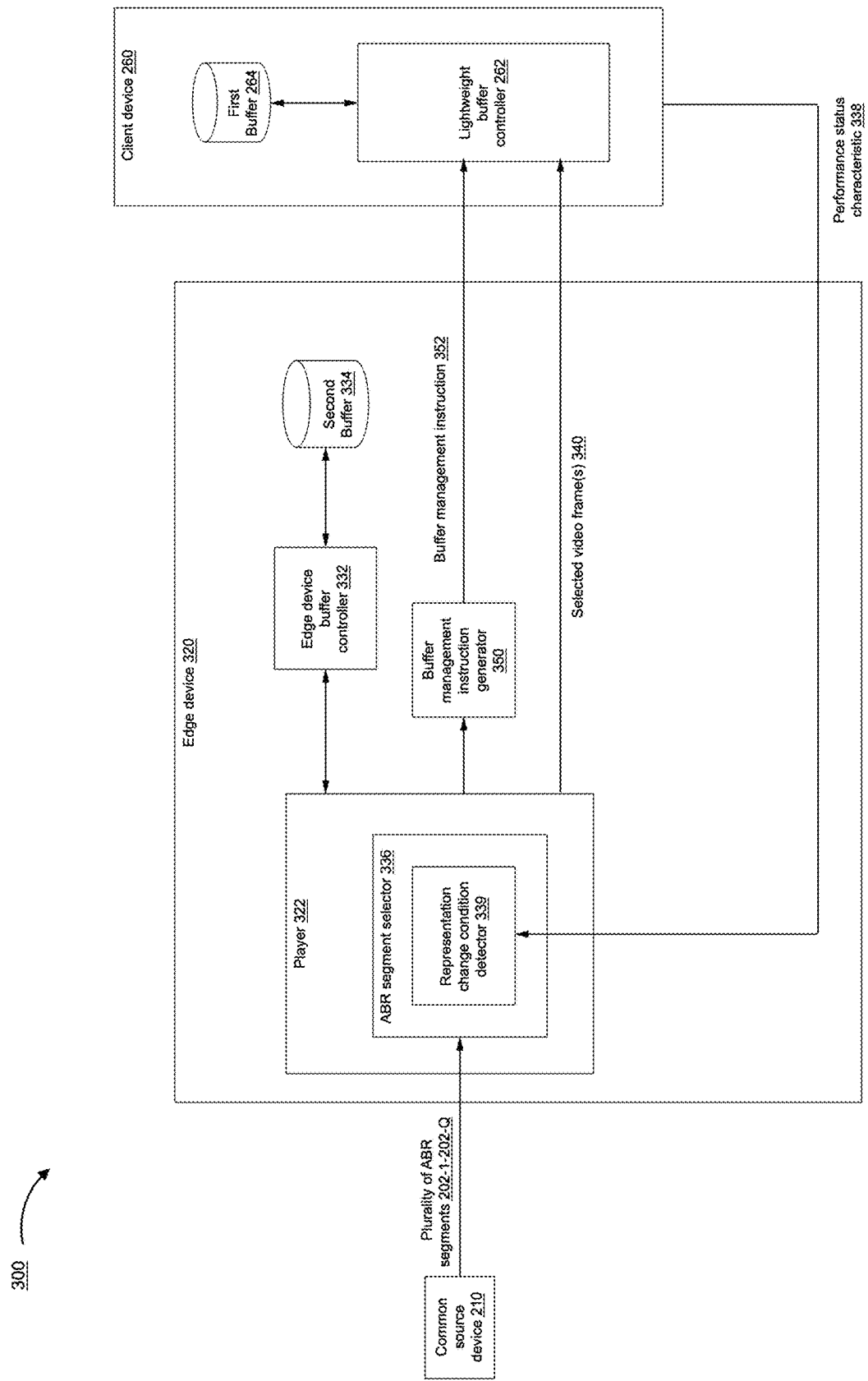
FIG. 3 is a block diagram of an example of a second environment for delivering video frames to a client device and correspondingly managing a buffer of the client device in accordance with some embodiments.

FIG. 3 is a block diagram of an example of a second environment 300 for delivering video frames to a client device and correspondingly managing a buffer of the client device in accordance with some embodiments. The second environment 300 includes an edge device 320 that transmits, to the client device 260, selected video frames 340 and an associated buffer management instruction 352. For example, in some embodiments, the edge device 320 is similar to and adapted from the edge device 220 illustrated in FIG. 2.

As illustrated in FIG. 3, a player 322 of the edge device 320 receives the plurality of ABR segments 202-1-202-Q from the common source device 210. The player 322 selects one of the plurality of ABR segments 202-1-202-Q, and transmits the video frames 340 to the client device 260. To that end, the player 322 includes an ABR segment selector 336 that selects a particular ABR segment.

According to various embodiments, the ABR segment selector 336 includes a representation change condition detector 339 that selects a particular ABR segment based on a performance status characteristic 338 from the client device 260. The performance status characteristic 338 characterizes the client device 260 currently receiving video frames. For example, the performance status characteristic 338 indicates a level of bandwidth available to the client device 260 as the client device 260 receives the video frames. As another example, the performance status characteristic 338 indicates a fill level of the first buffer 264 of the client device 260 as the client device 260 receives the video frames.

For example, while the player 322 is transmitting 1080p resolution video frames to the client device 260, the performance status characteristic 338 indicates an uptick in the amount of available bandwidth to the client device 260. Accordingly, the representation change condition detector 339 directs the player 322 to change from 1080p resolution to 4K resolution, and the player 322 correspondingly transmits, to the client device 260, a sequence of 4K resolution as the selected video frame(s) 340.

As another example, while the player 322 is transmitting 4K resolution video frames to the client device 260, the performance status characteristic 338 indicates the first buffer 264 of the client device 260 exceeds a threshold fill level (e.g., nearing a buffer overflow condition). Accordingly, the player 322 may reduce the transmission rate of the 4K resolution video in order to account for the buffer overfill. Alternatively, the representation change condition detector 339 directs the player 322 to change from 4K resolution to 1080p resolution, and the player 322 correspondingly transmits, to the client device 260, a sequence of 1080p resolution as the selected video frame(s) 340.

In some embodiments, the edge device 320 includes a edge device buffer controller 332 that controls a second buffer 334 of the edge device 320. The second buffer 334 may buffer video frames during transmission to the client device 260. For example, the edge device buffer controller 332 stores, in the second buffer 334, video frames of a particular ABR segment selected by the player 322.

The edge device 320 includes a buffer management instruction generator 350 that determines a buffer management instruction 352. For example, the player 322 provides, to the buffer management instruction generator 350, an indication of an encoding rate associated with a selected ABR segment. Continuing with this example, the management instruction generator 350 determines a buffer management instruction 352 that is based on the encoding rate.

The buffer management instruction generator 350 transmits the buffer management instruction 352 to the client device 260. The buffer management instruction 352 instructs the client device 260 to store the selected video frame(s) 340 in the first buffer 264 of the client device 260. For example, the buffer management instruction 352 instructs the lightweight buffer controller 262 to overwrite, in the first buffer 264, 720$p$ video frames with 1080p video frames because the player 322 is changing the selected video frame(s) 340 from 720p resolution to 1080p resolution.

Figure 4:
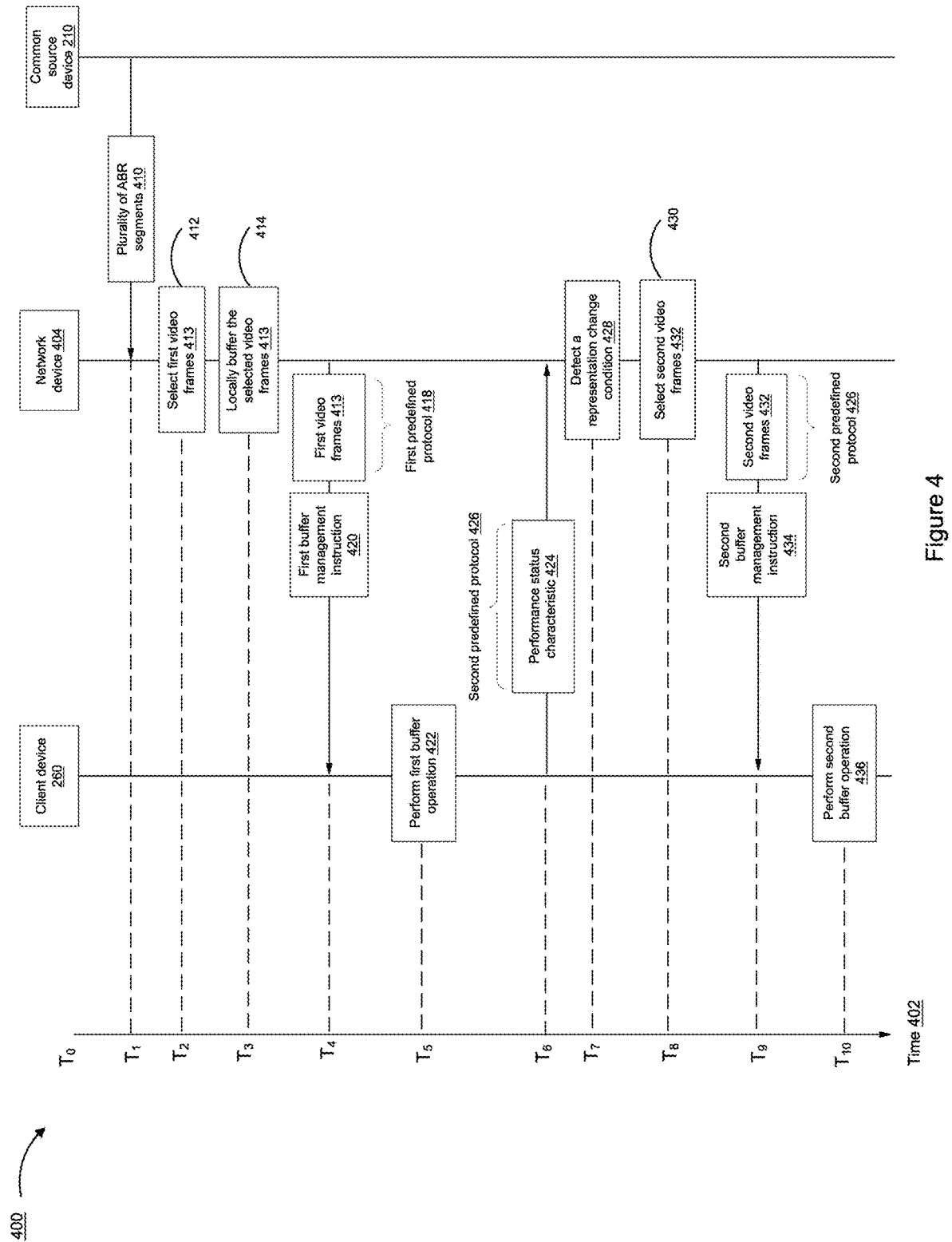
FIG. 4 is a timeline representation of a method of delivering video frames to a client device and correspondingly managing a buffer of the client device in accordance with some embodiments.

FIG. 4 is a timeline representation 400 of a method of delivering video frames to a client device and correspondingly managing a buffer of the client device in accordance with some embodiments. According to various embodiments, the technique illustrated by the timeline representation 400 is performed in part by a network device 404. For example, the network device 404 corresponds to an edge device, such as the edge device 220 illustrated in FIG. 2 or the edge device 320 illustrated in FIG. 3. As illustrated in FIG. 4, a current time indicator 402 indicates the passage of time, starting at an initial time $T_0$.

At a first time $T_1$, the network device 404 receives a plurality of ABR segments 410 from the common source device 210. For example, with reference to FIG. 3, the edge device 320 receives the plurality of ABR segments 202-1-202-Q from the common source device 210.

At a second time $T_2$, the network device 404 selects a first one or more video frames 413 of a first ABR segment, as represented by block 412. To that end, in some embodiments, the network device 404 selects a particular one of the plurality of ABR segments 410 based on a performance status characteristic from the client device 260, and the network device 404 extracts the first selected video frame(s) 416 from the particular one of the plurality of ABR segments 410.

At a third time $T_3$, in some embodiments, the network device 404 locally buffers the first video frame(s) 413, as represented by block 414. For example, with reference to FIG. 3, the edge device buffer controller 332 stores the first video frame(s) 413 in the second buffer 334. Storing video frames may enable the network device 404 to more quickly transmit a newly selected video frame to the client device 260. For example, with reference to FIG. 3, while transmitting 720p video frames to the client device 260, the representation change condition detector 339 determines a change from 720p to 1080p, based on the performance status characteristic 338. Continuing with this example, the player 322 selects a 1080p ABR segment from the common source device 210, and stores corresponding 1080p video frames in the second buffer 334 via the edge device buffer controller 332. The 1080p video frames and the 720p video frames are temporally aligned with each other (e.g., share a common segment boundary). Accordingly, the network device 404 need not request the common source device 210 to resend a temporally-aligned 1080p ABR segment, thereby reducing system latency.

At a fourth time $T_4$, the network device 404 transmits the first video frame(s) 413 to the client device 260 according to a first predefined protocol 418. For example, the first predefined protocol 418 corresponds to a predefined video streaming protocol that supports ABR streaming, such as Dynamic Adaptive Streaming over HTTP (MPEG-DASH), Microsoft Smooth Streaming (MSS), HTTP Dynamic Streaming (HDS), HTTP Live Streaming (HLS), etc. Moreover, at the fourth time $T_4$, the network device 404 transmits, to the client device 260, a first buffer management instruction 420 that is associated with the first video frame(s) 413. The first buffer management instruction 420 instructs the client device 260 to store the first video frame(s) 413 in a buffer of the client device 260 according to a first buffer operation. For example, with reference to FIG. 3, the edge device 320 transmits the buffer management instruction 352 to the lightweight buffer controller 262. In turn, the lightweight buffer controller 262 performs the first buffer operation with respect to the first buffer 264 of the client device 260 at a fifth time $T_5$, as represented by block 422. One of ordinary skill in the art will appreciate that, in some embodiments, transmission of the first video frame(s) 413 and transmission of the first buffer management instruction 420 occur at slightly different times.

At a sixth time $T_6$, the network device 404 receives a performance status characteristic 424 from the client device 260 (e.g., the performance status characteristic 308 in FIG. 3). The performance status characteristic 424 characterizes the client device 260 receiving the first video frame(s) 413. In some embodiments, the performance status characteristic 424 is communicated according to a second predefined protocol 426 that is different from the first predefined protocol 418. For example, the second predefined protocol 426 corresponds to a low-latency peer-to-peer protocol, such as Real-time Transport Protocol (RTP) or and/or RTP Control Protocol (RTCP). As another example, the network device 404 receives the performance status characteristic 424 over a Web Real-Time Communication (WebRTC) channel.

At a seventh time $T_7$, the network device 404 determines that the performance status characteristic 424 satisfies a representation change condition, as represented by block 428. For example, based on the performance status characteristic 424 indicating a relatively high utilization of processing resources by the client device 260, the network device 404 determines that the client device 260 is unable to download the remaining video frames of a currently selected ABR segment without experiencing a loss of video. Accordingly, the network device 404 determines that a lower resolution ABR segment is suitable. As another example, based on the performance status characteristic 424 indicating an uptick in bandwidth available to the client device 260, the network device 404 determines that the channel between the client device 260 and the network device 404 can handle higher resolution video frames.

At an eighth time $T_8$, in some embodiments, in response to determining that the performance status characteristic 424 satisfies the representation change condition, the network device 404 selects a second one or more video frames 432 of a second ABR segment, as represented by block 430. The second ABR segment is different from the first ABR segment selected at the second time $T_2$, based on the performance status characteristic 424, as described with reference to block 428. In some embodiments, the network device 404 locally buffers the second video frame(s) 432. Retrieval of the second video frame(s) 432 from the local buffer and subsequent transmission to the client device 260 results in less latency than issuing a new request to the common source device 210.

At a ninth time $T_9$, the network device 404 transmits the second video frame(s) 432 to the client device 260 according to the second predefined protocol 426. Moreover, at the ninth time $T_9$, the network device 404 transmits a second buffer management instruction 434 that is associated with the second video frame(s) 432. The second buffer management instruction 434 instructs the client device 260 to store the second video frame(s) 432 in the buffer of the client device according to a second buffer operation. One of ordinary skill in the art will appreciate that, in some embodiments, transmission of the second video frame(s) 432 and the second buffer management instruction 434 occur at slightly different times.

At a tenth time $T_{10}$, the client device 260 performs the second buffer operation, as represented by block 436. For example, the second buffer operation corresponds to an overwrite operation, in which the first video frame(s) 413 is overwritten by the second video frame(s) 432.

Figure 5:
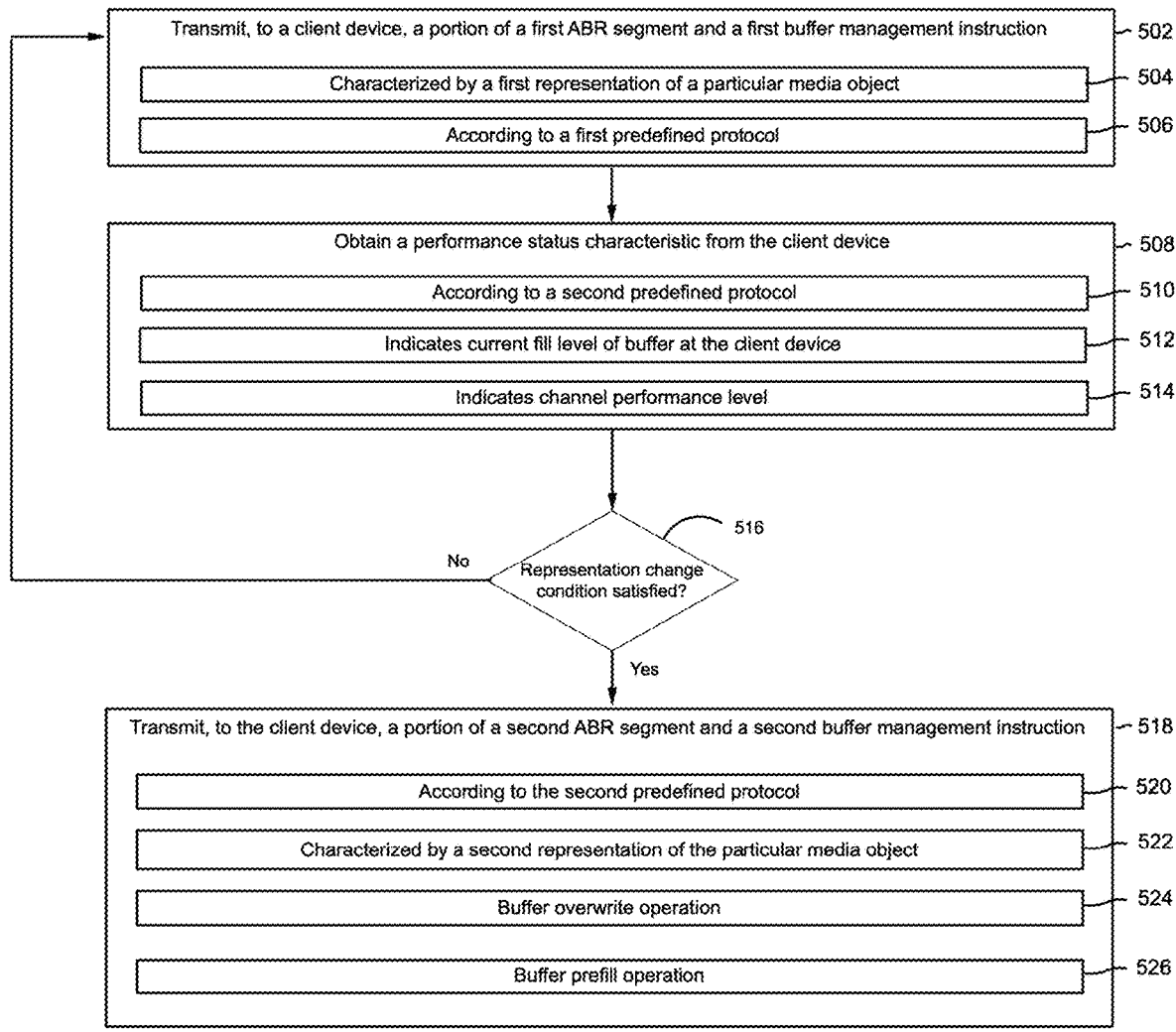
FIG. 5 is an example of a flow diagram of a method of delivering video frames to a client device and correspondingly managing a buffer of the client device in accordance with some embodiments.

FIG. 5 is an example of a flow diagram of a method 500 of delivering video frames to a client device and correspondingly managing a buffer of the client device in accordance with some embodiments. In some embodiments, the method 500 or portions thereof is performed by a network device that includes a plurality of network interfaces. For example, the network device corresponds to an edge device, such as a device that is at the edge of a cloud network, which includes one or more common source devices (e.g., CDN servers). In some embodiments, the method 500 or portions thereof is performed at a controller that is integrated in a network device. In some embodiments, the method 500 or portions thereof is performed by an apparatus with a plurality of network interfaces.

As represented by block 502, the method 500 includes transmitting, to a client device, a portion of a first adaptive bitrate (ABR) segment, and transmitting a first buffer management instruction that is associated with the portion of the first ABR segment to the client device. In some embodiments, the first buffer management instruction instructs the client device to store the portion of the first ABR segment in a buffer of the client device according to a first buffer operation. For example, with reference to FIG. 3, the edge device 320 transmits the selected video frame(s) 340 and corresponding buffer management instruction 352 to the client device 260.

As represented by block 504, the first ABR segment is characterized by a first representation of a particular media object. For example, the portion of the first ABR segment includes one or more video frames that are characterized by a 720p video resolution. As represented by block 506, transmitting the portion of the first ABR segment is according to a first predefined protocol, such as a video streaming protocol that supports ABR (e.g., MPEG-DASH). In some embodiments, transmitting the portion of the first ABR segment corresponds to transmitting less than the entirety of the first ABR segment.

As represented by block 508, the method 500 includes obtaining a performance status characteristic from the client device. The performance status characteristic characterizes the client device receiving the portion of the first ABR segment. For example, the performance status characteristic indicates a processor utilization level of the client device while the client device is receiving and decoding video frames included in the first ABR segment.

As represented by block 510, in some embodiments, a network device obtains the performance status characteristic according to a second predefined protocol, which is different from the first predefined protocol. For example, the second predefined protocol is a low-latency video conferencing protocol (e.g., RTP and/or WebRTC).

As represented by block 512, in some embodiments, the performance status characteristic indicates a current fill level of a buffer that is integrated in the client device. In some embodiments, the performance status characteristic indicates whether the buffer is experiencing overflow or underflow.

As represented by block 514, in some embodiments, the performance status characteristic indicates a channel performance level associated with a channel between the network device and the client device. For example, the channel performance indicator indicates a bandwidth level currently available to the client device. As another example, the channel performance indicator indicates a congestion level associated with the channel.

According to various embodiments, the performance status characteristic includes more than one of the aforementioned indicators.

As represented by block 516, the method 500 includes determining whether or not the performance status characteristic satisfies a representation change condition. For example, the performance status characteristic satisfies the representation change condition when the performance status characteristic indicate an uptick or downtick in a network metric (e.g., bandwidth or congestion), wherein the uptick or downtick exceeds a threshold magnitude.

In response to determining that the performance status characteristic does not satisfy the representation change condition, the method 500 reverts to block 502. For example, an edge device sends the next sequential video frame of the first ABR segment to the client device.

On other hand, in response to determining that the performance status characteristic satisfies the representation change condition, the method 500 continues to block 518. As represented by block 518, the method 500 includes transmitting, to the client device, a portion of a second ABR segment and a second buffer management instruction that is associated with the portion of the second ABR segment. In some embodiments, in response to determining that the performance status characteristic satisfies the representation change condition, the method 500 includes foregoing transmitting more video frames of the first ABR segment. As represented by block 520, transmitting the portion of the second ABR segment is according to the second predefined protocol (e.g., low latency WebRTC), thereby reducing system latency. Transmitting the portion of the second ABR segment may include transmitting less than the entirety of the second ABR segment.

As represented by block 522, the second ABR segment is characterized by a second representation of the particular media object that is different from the first representation. For example, based on the performance status characteristic indicating an uptick in available processor resources at the client device, the second ABR segment corresponds to a 4K representation, whereas the first ABR segment corresponds to a 1080p representation.

In some embodiments, determining that the performance status characteristic satisfies the representation change condition includes determining that the performance status characteristic falls below a threshold level associated with the first representation. Accordingly, the method 500 includes selecting the second representation to have a higher resolution than the first representation.

In some embodiments, determining that the performance status characteristic satisfies the representation change condition includes determining that the performance status characteristic exceeds a threshold level associated with the second representation. Accordingly, the method 500 includes selecting the second representation to have a lower resolution than the first representation.

In some embodiments, the second buffer management instruction instructs the client device to store the portion of the second ABR segment in the buffer of the client device according to a second buffer operation. For example, as represented by block 524, the second buffer operation includes a buffer overwrite operation. The buffer overwrite operation includes overwriting, in the buffer, the portion of the first ABR segment with the portion of the second ABR segment. In some embodiments, the first and the second ABR segments share a common segment boundary with respect to the particular media object, and the buffer overwrite operation includes overwriting at the common segment boundary. As another example, as represented by block 526, the method 500 includes a buffer prefill operation. To that end, the buffer prefill operation includes storing, in the buffer, at least a threshold portion of the second ABR segment before reading out the second ABR segment from the buffer (e.g., during video playout).

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the embodiments shown herein. Various modifications to the embodiments described in this disclosure may be readily apparent to those skilled in the art, and the generic principles defined herein may be applied to other embodiments without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   at a network device including a plurality of network interfaces:
   transmitting to a client device:
   a portion of a first adaptive bitrate (ABR) segment according to a first predefined protocol, wherein the first ABR segment is characterized by a first representation of a particular media object, and
   a first buffer management instruction that is associated with the portion of the first ABR segment;
   obtaining a performance status characteristic from the client device, wherein the performance status characteristic characterizes the client device receiving the portion of the first ABR segment; and
   in response to determining that the performance status characteristic satisfies a representation change condition, transmitting to the client device:
   a portion of a second ABR segment according to a second predefined protocol that is different from the first predefined protocol, wherein the second ABR segment is characterized by a second representation of the particular media object that is different from the first representation; and
   a second buffer management instruction that is associated with the portion of the second ABR segment.

2. The method of claim 1, wherein the first ABR segment includes a first plurality of video frames, wherein the second ABR segment includes a second plurality of video frames, wherein the portion of the first ABR segment includes a subset of the first plurality of video frames, and wherein the portion of the second ABR segment includes a subset of the second plurality of video frames.

3. The method of claim 1, wherein the first buffer management instruction instructs the client device to store the portion of the first ABR segment in a buffer of the client device according to a first buffer operation, and wherein the second buffer management instruction instructs the client device to store the portion of the second ABR segment in the buffer according to a second buffer operation.

4. The method of claim 3, wherein the second buffer operation includes a buffer overwrite operation, and wherein the buffer overwrite operation includes overwriting, in the buffer, the portion of the first ABR segment with the portion of the second ABR segment.

5. The method of claim 4, wherein the first and second ABR segments share a common segment boundary with respect to the particular media object, and wherein the buffer overwrite operation includes overwriting at the common segment boundary.

6. The method of claim 3, wherein the second buffer operation includes a buffer prefill operation, and wherein the buffer prefill operation includes storing, in the buffer, at least a threshold portion of the second ABR segment before reading out the portion of the second ABR segment from the buffer.

7. The method of claim 1, wherein the first representation is associated with a first video resolution, wherein determining that the performance status characteristic satisfies the representation change condition includes determining that the performance status characteristic falls below a threshold level associated with the first video resolution, the method further comprising:
   identifying a second video resolution that is less than the first video resolution based on the performance status characteristic falling below the threshold level; and
   in response to determining that the second ABR segment is characterized by the second video resolution, transmitting the portion of the second ABR segment to the client device.

8. The method of claim 1, wherein determining that the performance status characteristic satisfies the representation change condition includes determining that the performance status characteristic exceeds a threshold level associated with the second representation, the method further comprising selecting the second representation to have a higher video resolution than the first representation based on the performance status characteristic exceeding the threshold level.

9. The method of claim 1, wherein the performance status characteristic indicates a current fill level of a buffer that is integrated in the client device.

10. The method of claim 1, wherein the performance status characteristic indicates a channel performance level associated with a channel between the network device and the client device.

11. The method of claim 10, wherein the channel performance indicator indicates a bandwidth level currently available to client device.

12. The method of claim 10, wherein the channel performance indicator indicates a congestion level associated with the channel.

13. The method of claim 1, wherein the performance status characteristic indicates a current processor utilization level associated with a processor that is integrated in the client device.

14. The method of claim 1, wherein transmitting the portion of the first ABR segment corresponds to transmitting less than the entirety of the first ABR segment.

15. The method of claim 1, wherein the network device is not co-located with the client device.

16. The method of claim 1, wherein the network device is an edge device.

17. An apparatus comprising:
a plurality of network interfaces;
a buffer management instruction generator to:
determining a plurality of buffer management instructions associated with a plurality of video frames; and
transmit the plurality of buffer management instructions to a client device; and
a player to:
transmit, to the client device, a portion of a first ABR segment according to a first predefined protocol, wherein the first ABR segment is characterized by a first representation of a particular media object;
direct the buffer management instruction generator to determine a first one of the plurality of buffer management instructions that is associated with the portion of the first ABR segment;
obtain a performance status characteristic from the client device, wherein the performance status characteristic characterizes the client device receiving the portion of the first ABR segment; and
in response to determining that the performance status characteristic satisfies a representation change condition:
transmit, to the client device, a portion of a second ABR segment, of the plurality of ABR segments, according to a second predefined protocol that is different from the first predefined protocol, wherein the second ABR segment is characterized by a second representation of the particular media object that is different from the first representation; and
direct the buffer management instruction generator to determine a second one of the plurality of buffer management instruction that is associated with the portion of the second ABR segment.

18. The apparatus of claim 17, wherein the first buffer management instruction instructs the client device to store the portion of the first ABR segment in a buffer of the client device according to a first buffer operation, and wherein the second buffer management instruction instructs the client device to store the portion of the second ABR segment in the buffer according to a second buffer operation.

19. The apparatus of claim 18, wherein the second buffer operation includes a buffer overwrite operation, and wherein the buffer overwrite operation includes overwriting, in the buffer, the portion of the first ABR segment with the portion of the second ABR segment.

20. A non-transitory computer-readable medium including instructions, which, when executed by a network device including one or more processors and a plurality of network interfaces, cause the network device to:
transmit to a client device:
a portion of a first adaptive bitrate (ABR) segment according to a first predefined protocol, wherein the first ABR segment is characterized by a first representation of a particular media object, and
a first buffer management instruction that is associated with the portion of the first ABR segment;
obtain a performance status characteristic from the client device, wherein the performance status characteristic characterizes the client device receiving the portion of the first ABR segment; and
in response to determining that the performance status characteristic satisfies a representation change condition, transmit to the client device:
a portion of a second ABR segment according to a second predefined protocol that is different from the first predefined protocol, wherein the second ABR segment is characterized by a second representation of the particular media object that is different from the first representation; and
a second buffer management instruction that is associated with the portion of the second ABR segment.

* * * * *